(12) United States Patent
Han et al.

(10) Patent No.: US 11,813,599 B2
(45) Date of Patent: Nov. 14, 2023

(54) METHOD FOR COATING POROUS CATALYST SUPPORT AND DEVICE THEREFOR

(71) Applicant: HEESUNG CATALYSTS CORPORATION, Gyeonggi-do (KR)

(72) Inventors: Hyun-sik Han, Seoul (KR); Dong-Sun Seo, Gyeonggi-do (KR); Myeong-cheol Seon, Gyeonggi-do (KR); Seung-bok Yu, Gyeonggi-do (KR)

(73) Assignee: HEESUNG CATALYSTS CORPORATION, Gyeonggi-Do (KR)

( * ) Notice: Subject to any disclaimer, the term of this patent is extended or adjusted under 35 U.S.C. 154(b) by 329 days.

(21) Appl. No.: 17/283,583

(22) PCT Filed: Oct. 4, 2019

(86) PCT No.: PCT/KR2019/013010
§ 371 (c)(1),
(2) Date: Apr. 8, 2021

(87) PCT Pub. No.: WO2020/076009
PCT Pub. Date: Apr. 16, 2020

(65) Prior Publication Data
US 2021/0339237 A1    Nov. 4, 2021

(30) Foreign Application Priority Data
Oct. 12, 2018    (KR) .................... 10-2018-0121667

(51) Int. Cl.
*B01J 37/02* (2006.01)
*B01J 35/10* (2006.01)
*B01J 6/00* (2006.01)

(52) U.S. Cl.
CPC ........... *B01J 37/0215* (2013.01); *B01J 6/001* (2013.01); *B01J 35/10* (2013.01)

(58) Field of Classification Search
CPC ......... B01J 37/0215; B01J 6/001; B01J 35/10
See application file for complete search history.

(56) References Cited

U.S. PATENT DOCUMENTS 10,220,380 B2 * 3/2019 Han .................. B01J 37/0215
2014/0363578 A1   12/2014 Han et al.

FOREIGN PATENT DOCUMENTS

| JP | 2003-117408 | | 4/2003 |
| JP | 2003117408 A | * | 4/2003 |
| JP | 2009-189983 | | 8/2009 |
| JP | 2010-017666 | | 1/2010 |
| KR | 10-2013-0034688 | | 4/2013 |
| KR | 10-2014-0106916 | | 9/2014 |

OTHER PUBLICATIONS

PCT, PCT/KR2019/013010 (WO2020/076009), Oct. 4, 2019 (Apr. 16, 2020), Heesung Catalysts Corporation.
International Search Report and Written Opinion dated Feb. 3, 2020 by the International Searching Authority for International Application No. PCT/KR2019/013010, filed on Oct. 4, 2019 and published as WO 2020/076009 on Apr. 16, 2020 (Applicant—Heesung Catalysts Corporation) (9 Pages).

* cited by examiner

*Primary Examiner* — Yong L Chu
(74) *Attorney, Agent, or Firm* — Ballard Spahr LLP (57) ABSTRACT

A method for coating a monolithic porous catalyst support having a plurality of channels formed in a longitudinal direction with a catalyst slurry, and a device therefor are proposed. A pressure dispersion coating device for a porous catalyst support includes: a slurry quantitative input means; a container being variable in volume, having an open upper part thereof into which a slurry is input by the slurry quantitative input means, and having a bottom thereof movable; a container moving means fastened to one side of the container; a moving means fastened to a lower part of the container and having a shaft connected to the bottom of the container; an overflow outlet being formed on a side part of the container and provided with a valve; and a pressurizing means disposed on the open upper part of the container.

4 Claims, 6 Drawing Sheets

METHOD FOR COATING POROUS CATALYST SUPPORT AND DEVICE THEREFOR

CROSS-REFERENCE TO RELATED APPLICATIONS

This application is a U.S. National Phase Application of International Application No. PCT/KR2019/013010, filed Oct. 4, 2019, which claims priority to Korean Application No. 10-2018-0121667, filed Oct. 12, 2018, each of which are hereby incorporated by reference in their entirety.

TECHNICAL FIELD

The present invention relates to a device and method for coating a porous catalyst support having a plurality of channels with a slurry. The present invention relates to a device and method for coating a support, particularly a large-sized support for ships, by a slurry pressure dispersion method, the support having a plurality of channels as in a monolithic support used in a catalytic converter for a post-treatment of exhaust gas.

BACKGROUND ART

The catalytic converter is a structure that allows to convert harmful substances of exhaust gas into harmless substances through catalysis. A typical form of catalytic converter has a monolithic support or substrate in which a slurry containing various catalyst components (hereinafter, catalyst slurry) is coated on a plurality of channels in the longitudinal direction. The substrate is also called a body or a carrier and is made of ceramic or other material. Various methods of coating a monolithic body with a catalyst slurry are known in the related art.

In particular, according to a method of Korean Patent No. 1271434 (METERED WEIGHT COATER FOR PRECISE PM CONTROL), the method includes: inputting a catalyst slurry into a quantitative container; moving a monolithic support to an upper part of the container; sealing the monolithic support and the container from the outside; moving the container upward; and releasing the seal at the same time as applying the vacuum, wherein the catalyst slurry may be quantitively injected into channels of a support. That is, when a quantitative slurry is forcibly injected into the channels of the support, the quantitative slurry first stays in the space at the lower part of each channel, and then when the vacuum is applied by a vacuum means on the upper part of the support and the seal is released, a portion of the injected slurry is pulled into the space of the upper part of each channel and is deposited and coated onto the inner wall of each channel, whereby a uniformly coated support may be obtained.

DISCLOSURE

Technical Problem

A large-sized catalyst support, which is porous, is applied as a catalyst structure for ships. Specifically, as a ceramic body having a porosity of about 60 to 90% and an average pore diameter of 10 to 20 μm, it is preferable for a catalyst slurry to be deposited as a layer on the inner wall of each channel, and to penetrate into the pores as much as possible. However, the conventional dipping method or quantitative coating method takes a long coating time and is not suitable to be applied to a large-sized support for ships. Moreover, there are problems in that the degree of deposition in the pores of the support is low when a coating object is a porous support, and a work process is inefficient because control for quantification is required when the slurry is quantitatively injected. In particular, as in the case of a catalyst structure for ships, a case of using a large-sized catalyst support is more problematic.

Technical Solution

The present invention provides a method of coating a monolithic porous catalyst support having a plurality of channels formed in a longitudinal direction with a catalyst slurry, and more particularly, discloses a coating method for a porous catalyst support, the coating method including: inputting the catalyst slurry into a container having a bottom thereof moved up and down; horizontally disposing a lower end of the catalyst support and an upper end of the container; sealing the lower end of the catalyst support and the upper end of the container with the outside; and applying a positive pressure at an upper end of the catalyst support while moving the bottom of the container upward.

As various exemplary embodiments, the present invention may further include: moving the bottom of the container downward after the applying of the positive pressure; and removing the slurry that is residual inside the porous catalyst support by air blowing at the upper end of the catalyst support. As another exemplary embodiment, the present invention may further include: releasing a seal of the lower end of the catalyst support and the upper end of the container; and moving a coated catalyst support. In addition, the present invention may further include: drying the coated catalyst support; and calcinating the coated catalyst support.

Meanwhile, another objective of the present invention is to provide a pressure dispersion coating device for a porous catalyst support, and the pressure dispersion coating device is configured to include: a slurry quantitative input means; a container being variable in volume, having an open upper part thereof into which a slurry is input by the slurry quantitative input means, and having a bottom thereof movable; a moving means fastened to a lower part of the container and having a shaft connected to the bottom of the container; an overflow outlet being formed on a side part of the container and provided with a valve; and a pressurizing means disposed on the open upper part of the container.

In various exemplary embodiments of the present invention, the pressure dispersion coating device for the porous catalyst support may further include: a sensor that helps control opening and closing of the valve, and the sensor may be a timer or a level sensor. In addition, the present invention may further include a sealing means between a lower end of the catalyst support and an upper end of the container, and may further include a support fixture for horizontally maintaining leveling of the lower end of the catalyst support and the upper end of the container.

Advantageous Effects

According to a pressure dispersion injection method and device according to the present invention, the catalyst slurry is injected into the channels of the porous support, and most of the slurry is dispersed and penetrates into the pores of the support, so that a catalytic converter suitable for ships may be manufactured. In addition, by adopting the pressure dispersion injection method, it is possible to solve the problems of coating time and precise control that occur due to the conventional dipping method or quantitative injection.

DESCRIPTION OF DRAWINGS

The drawings are for explaining exemplary embodiments of the present invention and are not intended to limit the invention included in the claims.

BEST MODE

The present invention is to propose a pressure dispersion coating device and method. More particularly, the present invention proposes a method and device for coating a monolithic porous support, specifically, a large-sized support for ships, with a catalyst slurry that is applied to a post-treatment of exhaust gas, the support having a plurality of channels formed in the longitudinal direction. In the present invention, the term "pressure dispersion" refers to a method that provides a coating formation in which a slurry injected into channels by applying a pressurization step in a conventional slurry coating method may be deposited into a plurality of pores formed on the wall of each channel. In other word, the pressurization refers to applying pressure in a direction opposite to a slurry injection direction, and the dispersion refers to diffusing or dispersing the slurry to the wall of each channel by opposite pressure, so as to improve the coating formation. According to the present invention, coating using the slurry in the pressure dispersion method is intended to solve the problems such as control difficulties and slow coating time, which occur in the conventional dipping method or a coating device for achieving quantitative filling. The coating device according to the present invention includes: a slurry input means; a container being upwardly open and containing the slurry; a container moving means; a moving means of a bottom of a container; and a pressurizing means, wherein an outlet provided with a valve is formed on a side of the container to allow some excess slurry to be discharged prior to a coating operation. The coating device of the present disclosure further includes: a support fixture, a sealing means between a support and the container, and a support transfer means, but is not limited thereto.

In addition, the present invention proposes a coating method. In particular, the present invention proposes a method for coating a monolithic porous support with a catalyst slurry by a pressure dispersion method, the monolithic porous support having a plurality of channels formed in the longitudinal direction and being applied to the post-treatment of exhaust gas from ships. The coating method according to the present invention includes: inputting a catalyst slurry non-quantitatively into a container; leveling the lower end of a monolithic porous support and the upper end of the container; sealing the support and the container from the outside; and simultaneously applying positive pressure while moving the bottom of the container upward. The coating method of the present disclosure further includes releasing the seal between the support and container and the outside, and moving the coated support but is not limited thereto. Moreover, the present invention may further include: drying the coated support; and calcinating the coated support. In the present invention, "non-quantitative" refers to a term in which a slurry having a predetermined coating amount or more is provided to the container. The term "non-quantitative" is in contrast to a term used in the quantitative coating where the slurry is input into the container "quantitatively".

Figure 1:
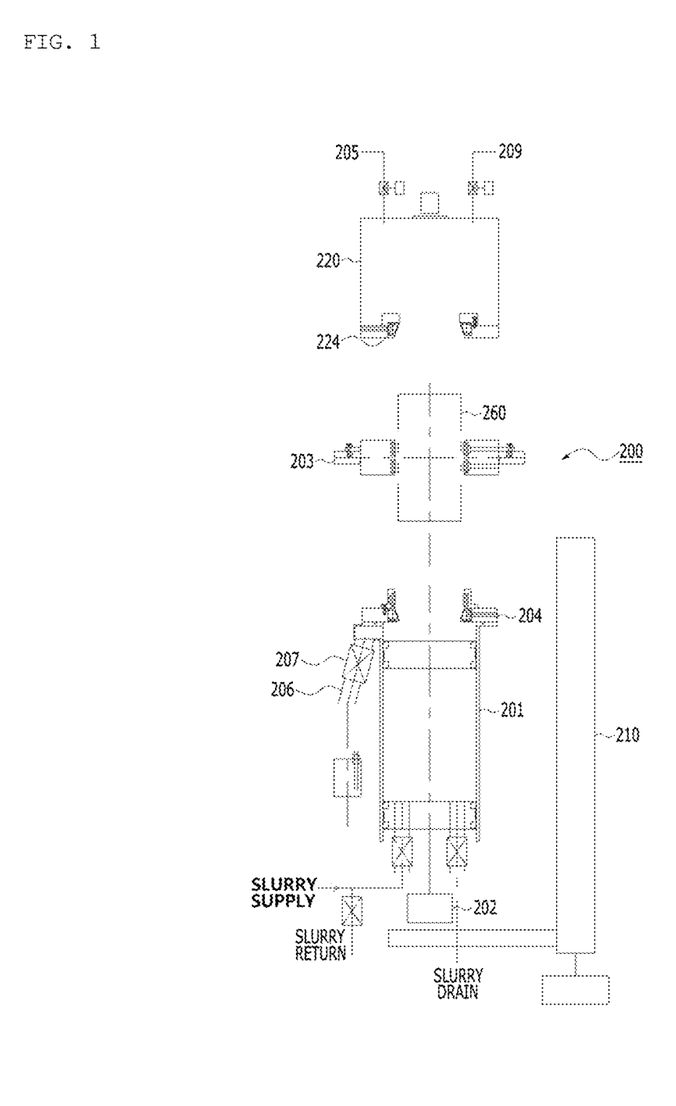
FIG. 1 is a schematic view showing a coating device for a porous support according to the present invention.

FIG. 1 schematically shows a coating device for a large-sized support for ships according to the present invention.

The coating device 200 according to the present invention includes: a slurry input means; a container 201 being variable in volume (also referred to as a piston type dippan), being input with the slurry, having an upper part thereof open, and having a bottom thereof movable; a container moving means 210; a moving means 202 of a bottom of a container; a pressurizing means 205 disposed on the dippan; and an upper hood 220 provided with a blowing means 209. In addition to these essential components, the coating device according to the present invention further includes: a clamp 203 for the support 260; a sealing means 204 between the support and the container; a sealing means 224 between the support and the upper hood; and a means for checking a coating process, the means being provided on the upper hood and being a camera as an example.

The container 201 being variable in volume according to the present invention is disposed under the support 260. More specifically, the upper end of the container 201 being variable in volume and the lower end of the support 260 are movably disposed on the same plane. Typically, the container being variable in volume is raised or lowered by the container moving means and is raised so that the lower end of the support and the upper end of the container realize the horizontal leveling. The container being variable in volume is configured to have a cross-sectional shape coincident with the cross-sectional shape of the support. More preferably, the shapes of the cross-sections of the upper end of the container being variable in volume and the lower end of the support are coincident with each other. The cross section of the container is formed to correspond to the cross section of the support, so that in the coating process, the slurry input in the container enters inside the channels of the support 260 by physical pressure according to the rise of the piston-like moving means of a bottom of a container. The container 201 which may be raised and lowered by itself is variable in volume. The container is configured to include a surrounding wall and a bottom, the bottom being displaceable. That is, the bottom of the container is preferably fastened with a moving means 202 for vertical movement and is able to move up and down, so that the container volume may decrease when moving upward and the container volume may return to its original volume when moving downward. The circumferential surface of the bottom of the container may slide tightly along the wall of the container. The gaps between the circumferential surface of the bottom of the container and the wall of the container may be sealed by a known sealing means. Tight sliding means that the slurry contained in the container does not spill through the gaps that may form between the bottom and the wall of the container, and the bottom of the container may move along the wall of the container. The bottom of the container may be leveled by a specific means, for example a level sensor. The container may be made of various materials, and the materials of the wall and the bottom of the container may be the same with each other or different from each other. Preferably, the wall and bottom of the container are made of stainless steel. The bottom of the container is connected to the moving means 202. A conventional driving means and a shaft coupled thereto may constitute the moving means, and the shaft may be fastened to the bottom of the container. Meanwhile, a sealing means 204 is provided at the upper end of the container. The sealing means is configured to inject the entire slurry into the channels, that is, configured to prevent the slurry from flowing out of the support when the catalyst slurry filled in the container enters the support 260, due to the rise of the bottom of the container raised by the moving means, through the channels open at the lower part of the support 260. The sealing means 204 is provided at a level of the upper end of the container and the lower end of the support. Preferably, the sealing means is composed of an O-ring to seal the lower end of the support from the outside by pneumatic or hydraulic pressure applied from outside the O-ring. The lower end of the support is disposed to be horizontally coincident with the upper end of the container by means of a clamp 203 which is a support fixture described below. Since the cross sections of the container and the support are identical, when the lower end of the support is disposed to coincide with the upper end of the container, the sealing means operates around both the upper end of the container and lower end of the container, so that the upper and lower ends are tightly sealed, thereby preventing spillage of slurry to the outside of the sealing means.

The present invention is for injecting a catalyst slurry into channels of a support, thereby coating the channels of the support. The slurry coated inside the channels is preferably input into a container by a pump through the bottom of the container, but a predetermined coating amount is not input into the container. This means that a precise injection device for quantitative injection is unnecessary. That is, the slurry to be coated is approximately input into the container through the pump. A portion of the slurry input through the pump, that is, the slurry having a coating content more than the content expected to be injected into the channels of the support, is provided on the side of the container and may be discharged through an overflow outlet 206 provided with a valve 207. The excess slurry discharged through the outlet may be provided to a slurry supply part (not shown) again. The coating device according to the present invention is for applying to a large-sized support and, more preferably, to a large-sized support for ships, and precise control is not applicable, in order to coat the inside of the channels of the large-sized support in a short time. Accordingly, a slurry having an approximate amount is input into the container through the slurry input means such as a pump, and the slurry is put into the container in a short time, but the amount more than the expected coating amount is recycled back to the slurry supply part through the outlet. Meanwhile, the coating device according to the present invention may include a sensor that helps control opening and closing of the valve provided at the outlet, and may preferably be a timer or a level sensor. The coating device of the present invention includes a pressurizing means 205 such as an air compressor on the open upper part of the container. The pressurizing means is a positive pressure imparting means for achieving the objectives of the present invention, wherein the porous catalyst support for ships, which is a body to be coated according to the present invention, has an open porosity of about 60 to 90% and an average pore diameter of 10 to 20 µm, so in order to diffuse the slurry into these pores, pressure is applied from the upper part of the support at the same time as the slurry is forcibly injected, which is not a conventional coating method, whereby the catalyst slurry is deposited by penetrating into the pores as much as possible, rather than being deposited as a layer on the inner wall of each channel. More specifically, the slurry is injected into the channels of the support by raising the piston-type container, and at the same time the slurry is being pressurized at the upper part of the support, so that the slurry input from the lower part of the support is pressed into the pores of the porous support, thereby obtaining an embedded-type carrier suitable for a support for ships. The residual slurry that is not input into the pores even by the pressurizing means or is not coated on the inner wall of each channel may be recovered in the container and then recycled. Accordingly, the pressure dispersion coating method according to the present invention is different from the quantitative coating method in which all the slurry injected into the channels is to be received in the channels and then coated, and the excess slurry is not discharged to the outside through the channels of the support. According to the present invention, a slurry having an approximate amount more than the amount of quantitative injection is input into the container 201 through an input means in communication with the bottom of the container. In the present invention, the pressurization refers to applying pressure of at least 0.1 bar or more, preferably 0.1 bar to 0.2 bar, based on atmospheric pressure. Meanwhile, an observation means that a camera and the like may be added to the upper hood in order to observe the slurry or prevent the slurry from overflowing through the upper end of the support during the process where the slurry is pressed into the pores of the support.

The support 260 may have various shapes, but generally has a monolithic structure in which a plurality of channels are arranged in parallel in the longitudinal direction. Typically, the support may be made of ceramic, metal, and plastic, which are materials for low temperature applications. In addition, this monolithic structure is provided with fine channels extending in parallel from the lower surface of the support to the upper surface of the support, and gas may flow through the channels. Each cross section of the channel may have various sizes and shapes such as a rectangle, square, hexagonal, oval, circular, trapezoid, and the cross section typically includes 60 to 600 channels per square inch. The catalyst slurry mentioned in the present invention is not particularly limited thereto. For example, the catalyst slurry may be a three-way catalyst slurry, a diesel oxidation catalyst slurry, a nitrogen oxide removal catalyst slurry, and the like. In particular, the support according to the present invention is preferably a large-sized support for ships, that is, the support may be effectively applied to the large-sized support for ships where efficient coating is not possible due to a long coating time required by the conventional dipping method or the quantitative coating method. Referring back to FIG. 1, the accessories necessary for the coating device according to the present invention will be described, but these accessories are known to those skilled in the art of conventional coating devices. The clamp 203, which is a support fixture, fixes the support, and has a form of a plate in which the upper and lower parts of the support are exposed, but is not limited thereto. By the support fixture, the lower end of the support may be disposed horizontally with the upper end of the container being variable in volume as described above. The present invention may be provided with a separate blowing means. That is, some of the catalyst slurry injected by a physical pressurization and positive pressure means such as a piston and diffused into the pores may be recovered back into the container by air blowing through a blowing means 209 such as a blower provided at the upper parts of the channels. The coating may be performed once or twice, and the upper or lower part of the support may be alternately coated, and may be dried or calcinated after the coating is completed, but these subsystemic configurations are technical components known in the art. In addition, commands required for operating the coating device 200 may be operated by programs readable by a computer (not shown).

According to the present invention, the injection of the catalyst slurry is characterized in that the slurry is injected into the pores formed in the channel wall of inside each channel by the method of physically pressurizing from the bottom and pressurizing from the top. That is, it is characterized in that the slurry is forcibly injected into the channels by physical pressure, and at the same time the slurry injected into the channels is distributed to the pores of all the walls of the channels by the pressurization. In addition, according to the present application, it should be noted that a container, an injecting means, and a container moving means are arranged on one side.

In one aspect of the present invention, the present invention provides a coating method. In particular, the present invention proposes a method for coating a monolithic support with a catalyst slurry, applied to a post-treatment of exhaust gas of a ship engine, by a pressure dispersion method, the monolithic support having a plurality of channels formed in the longitudinal direction. The coating method according to the present invention includes: inputting a catalyst slurry into a container having the bottom thereof moved up and down; leveling the lower end of a catalyst support and the upper end of the container; sealing the lower end of the catalyst support and upper end of the container from the outside; and applying a positive pressure at the upper end of the catalyst support while moving the bottom of the container upward. Furthermore, after the applying of the positive pressure, the present invention further includes: removing the slurry that is residual inside the porous catalyst support by air blowing at the upper end of the catalyst support; and moving the bottom of the container downward. In addition, the present invention further includes: releasing the seal of the lower end of the catalyst support and the upper end of the container; and moving the coated porous catalyst support. The coated porous catalyst support may be dried and calcinated.

Since the catalyst slurry is injected in the longitudinal direction of the support, when excess slurry is injected into the channels, a certain amount of slurry is deposited and coated on the wall of each channel, but the content excessing the certain amount is discharged from the support. The present invention is configured such that a slurry is injected into the channels of the support by the method of injecting the slurry into the pores in the porous support, and a positive pressure is applied at the upper part of the support to inject the slurry into the pores of the support, so as to have almost no slurry spilling out of the channels. According to one aspect of the present invention, the present invention does not apply a vacuum method, but rather a pressurization method is applied when injecting the catalyst slurry into the support. In general, as the method for coating the support with the catalyst slurry, a method including the vacuum method, the physical pressure method, or the physical pressure and/or the vacuum method has been adopted, but the present inventors was able to confirm that when pressurizing the catalyst slurry to be moved by the physical pressure, the catalyst slurry may be diffused in the channels. According to the present invention, a catalyst slurry is placed on one side of a support, physical pressure generated by a method that includes a mechanical means such as a piston is applied to the catalyst slurry, and then the pressurized catalyst slurry is injected into channels of the support. In the present application, a pressurizing means may be applied in a direction opposite to the direction where physical pressure is applied in order to expand the distribution of the catalyst slurry into pores formed inside the channels, at the same time as the catalyst slurry is injected into the channels of the support by the physical pressure.

According to another aspect of the present invention, in coating the channels of the support with the catalyst slurry, a piston-type physical injecting means and the pressurizing means are arranged above and below the support.

Referring to FIG. 2, the coating process will be described. First, a support 260 is inserted into a clamp 203 which is a fixture, and is disposed in a waiting position. The process of inserting the support into the fixture may be performed by an automated robotic mechanism. The support fixed to the clamp waits at the position between the container 201 and the upper hood 220 on which the pressurizing means 205 and the blowing means 209 are provided.

Figure 2A:
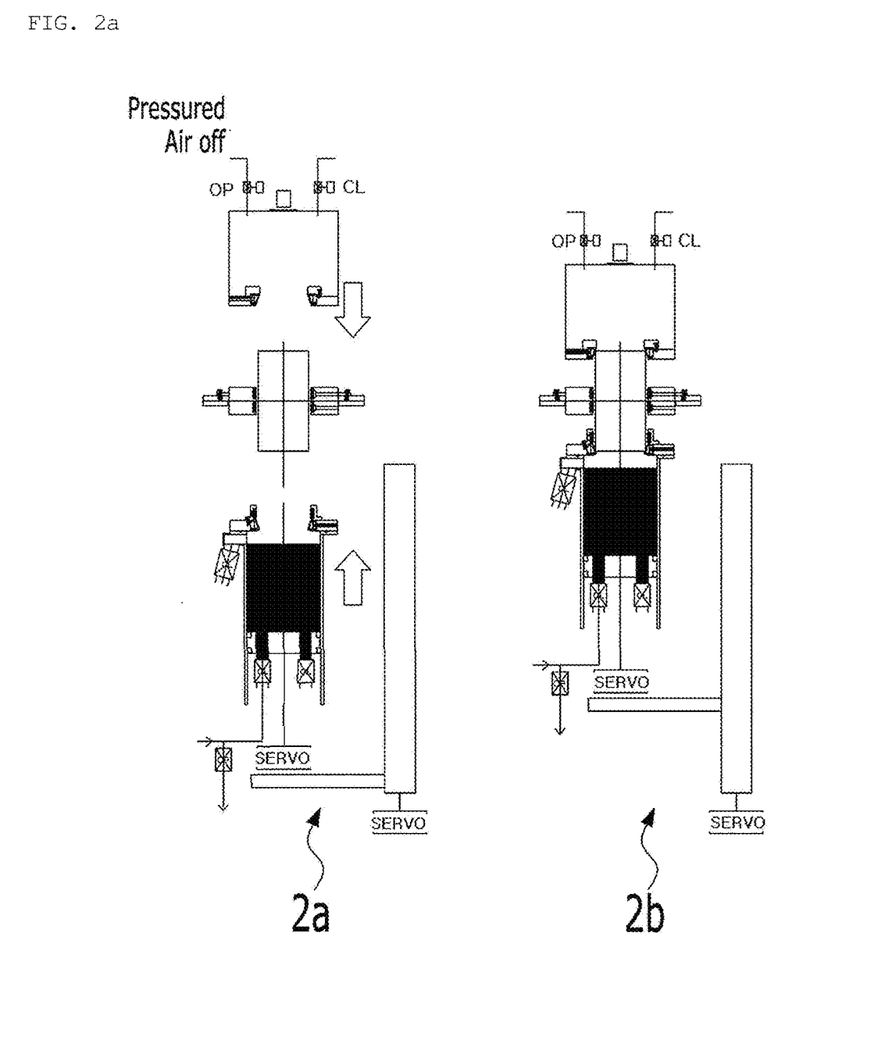
FIGS. 2a to 2d are procedure views showing a coating method for the porous support according to the present invention.
Figure 2B:
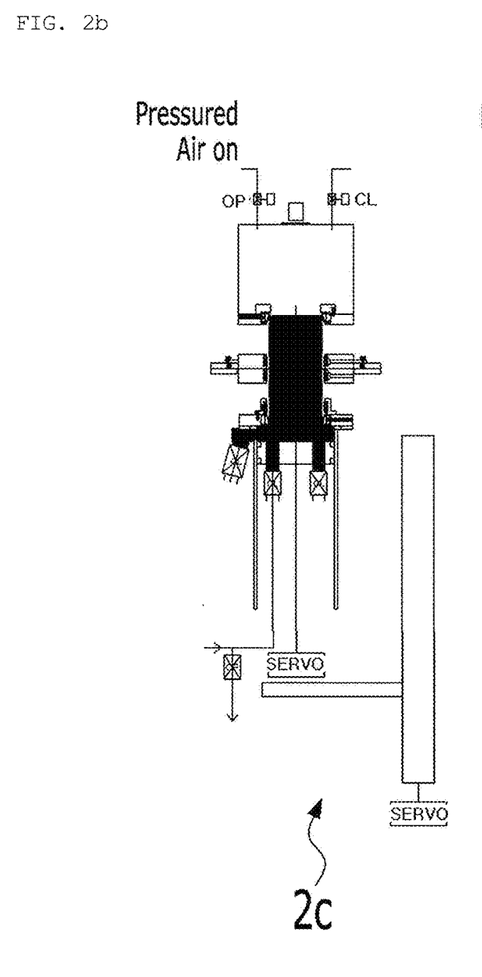

According to FIG. 2a, a catalyst slurry is input into a container 201. Inputting of the catalyst slurry is completed by means of an inputting or feeding means (not shown), such as a pump, through a path in communication with the bottom of the container. The input amount is determined according to the support type, application, etc. The slurry is rapidly input into the container by the pump. The input slurry, having an amount that substantially exceeds an amount for coating of channels, is discharged to the outside through the outlet 206 provided at one side of the container. In this way, the capacity to be discharged through the outlet is adjusted by a sensor applied to the container, for example, the sensor helping control opening and closing of the valve 207 of the outlet, and the sensor may be a timer or a level sensor. In this way, by rapidly injecting the slurry into the container and then discharging the excess slurry from the container by means of using such a sensor, it is possible to solve the problems of the electronic and mechanical factors and the injection time, that are generated due to precise control according to the quantitative injection. The discharged slurry may be recovered back to the slurry supply part. FIG. 2a shows a state in which the slurry is filled in the container, wherein the valve 207 is closed, and the slurry outlet communicating with the bottom of the container is closed as well. In addition, referring to FIG. 2a, the support 260 fixed by the clamp 203 on the upper part of the container filled with the slurry is in a waiting state. Referring to FIGS. 2a and 2b, the container itself is raised and lowered by the container moving means 210, and the upper end of the container is disposed to be horizontal with the lower end of the support, the container and the upper hood are vertically moved so that the upper end of the support and the lower end of the upper hood 220 are horizontally disposed, and the sealing means 224 and 204 each placed on the lower end of the upper hood and the upper end of the container are respectively sealed with the upper and lower ends of the support, whereby as described below, it is configured such that when the catalyst slurry filled in the container enters the support 260 through the open channels provided at the lower part of the support 260, due to the rise of the bottom of the container raised by the moving means 202, the entire slurry is injected into the channels, that is, the slurry does not flow out of the support.

Figure 2C:
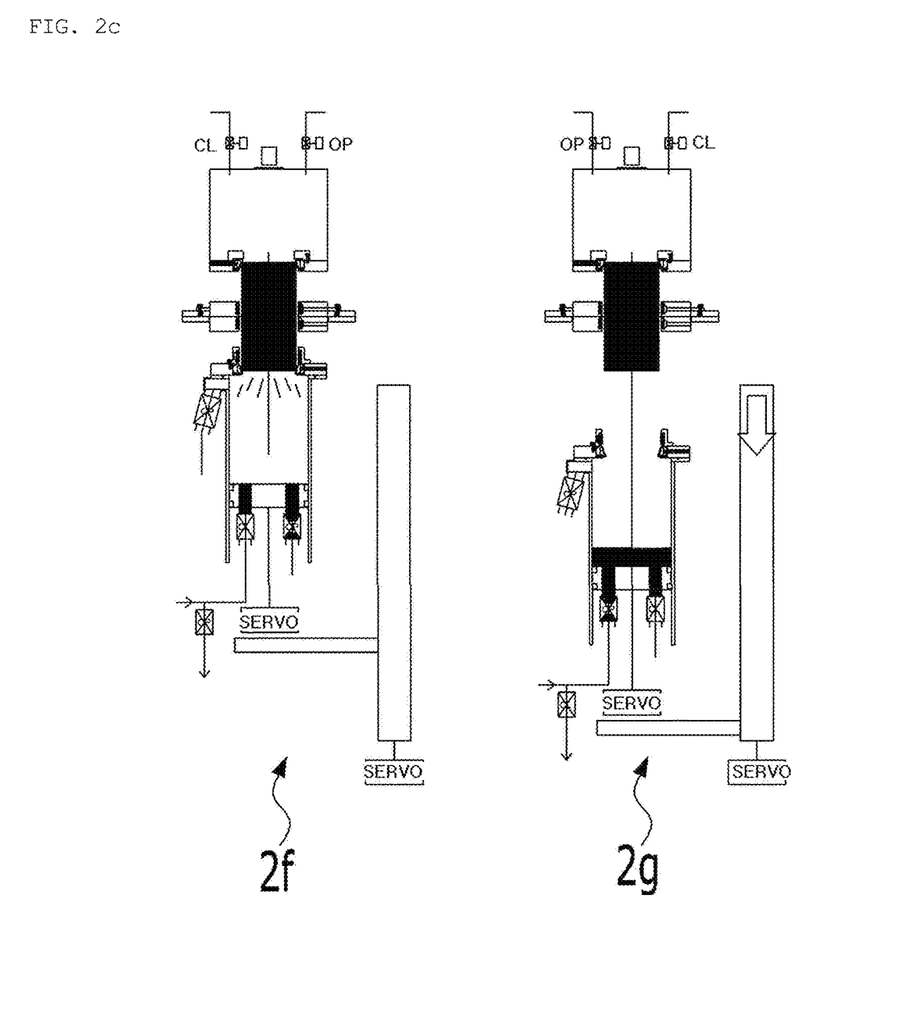
Figure 2D:
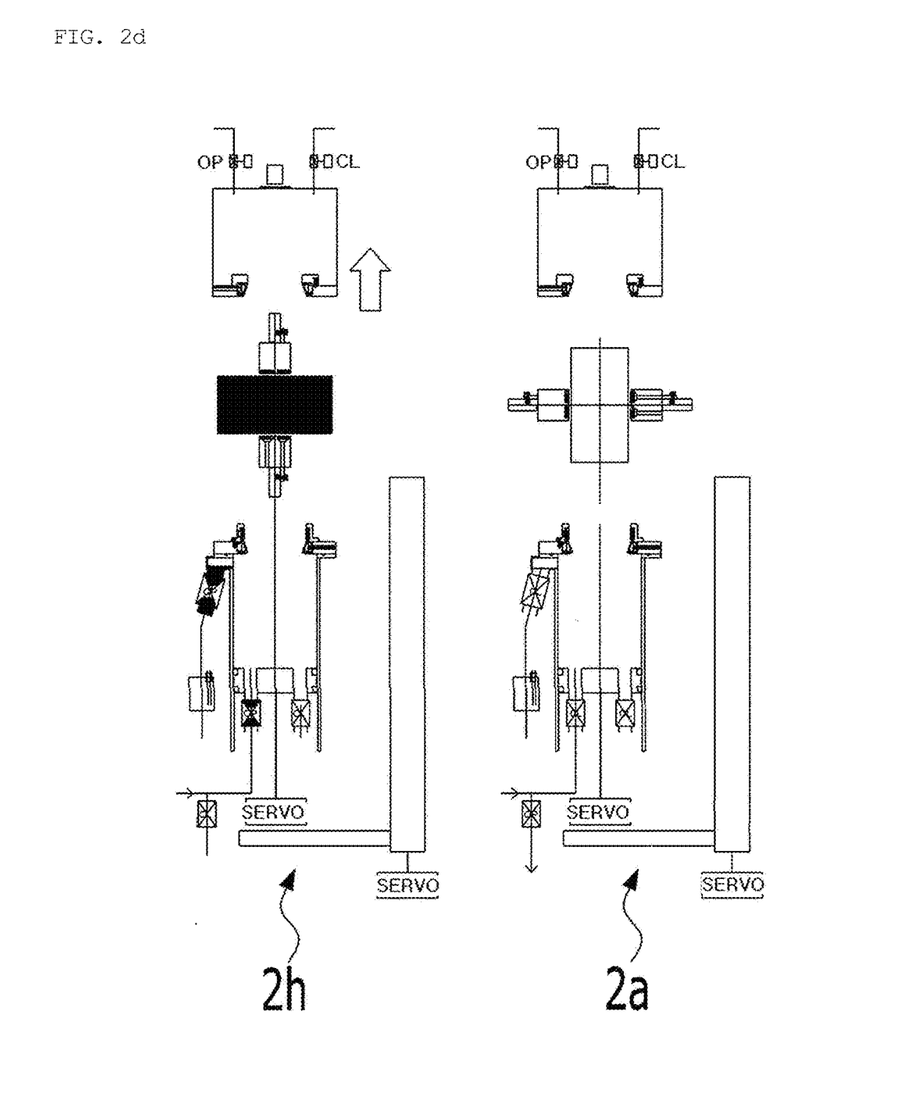

Referring to FIG. 2c, the moving means 202 of a bottom of a container is moved upward, and accordingly, the bottom of the container is moved toward the lower end of the support. Since there is no separate outlet other than the flow paths including the upper part of the container and the channels of the support, the catalyst slurry moved upward by the bottom of the container is injected into the channels. The upward movement of the bottom of the container is stopped at a level in contact with the lower end of the support. At this time, compressed air is injected toward the upper end of the catalyst support by the pressurizing means 205 disposed above the support. As described above, a plurality of pores is distributed in the wall of each channel of the support. It is difficult to accommodate the slurry into these pores by a conventional coating method. As a result of injecting the slurry into the channels by moving the moving means of a bottom of a container upward and at the same time applying a positive pressure from the upper part of the channels, the present inventors surprisingly realized that a considerable amount of slurry penetrated into the pores, thereby making it possible to manufacture a desirable catalytic converter. It was confirmed that this pore-accommodating effect is proportional to the positive pressure and the size of the pore. Referring to FIG. 2d, the bottom of the container is lowered by the piston motion. At this time, a small amount of slurry may be present in the container. Unlike the conventional quantitative coating method, since the amount of slurry injected into the channels of the support is not precisely measured, but an approximate amount of slurry is injected into the container, a little slurry may remain in the container after being injected into the channels as the bottom of the container is raised. In addition, the slurry injected into the channels does not deposit on the inner wall of each channel and the pores, and some slurry may flow back into the container through the lower end of each channel of the support. In order to help discharge the excess slurry from such channels, air is blown from the upper part of the support using the blower 209 so that the slurry is coated on the inner wall of each channel or the slurry that is not penetrated into the pores is discharged to the container disposed below. The slurry that has flowed out naturally or forcibly by air blowing is transferred back to a slurry supply part (not shown) through an input path communicating with the bottom of the container (see a view 2f left side in FIG. 2c). A view 2g right side in FIG. 2c shows the final step of the coating method, wherein the seal of the upper end of the container and the lower end of the support is released, and the container itself is lowered by the container moving means, thereby ending a series of cycle processes. For later work, the coated support may be rotated 90 degrees. Although not shown, the support coated by the support fixture is transferred to a separate position, and is thus completed through requested steps, for example the drying step and calcinating step.

Figure 3:
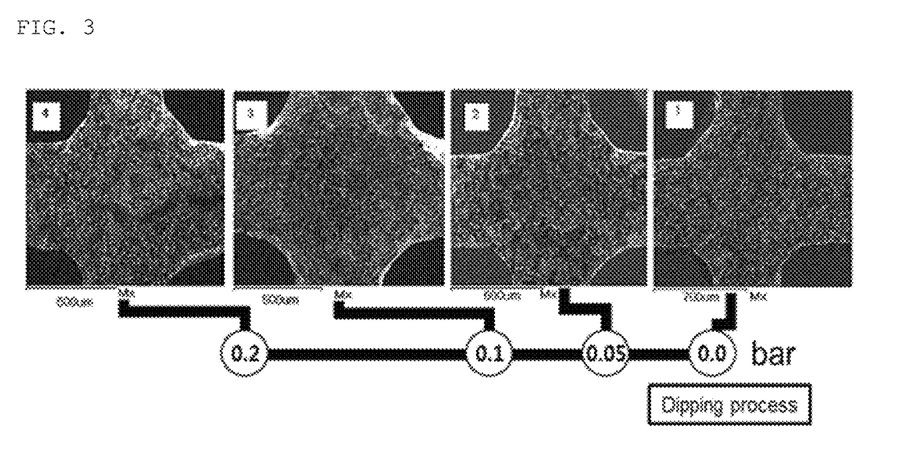
FIG. 3 are photos of SEM/EDS showing degrees of slurry deposition in pores formed inside the support as the slurry is injected into channels and various pressures are applied thereto at the same time. The rightmost photo shows a coated state generated by a conventional coating method in which pressure is not applied at the same time as injection is performed. AS viewed one by one leftward, each photo shows the coated state obtained by gradually applying a higher pressure. On the rightmost side, the slurry (in green) is intensively coated on the inner wall of each channel, but on the leftmost side, it may be seen that through the pores, the slurry is diffused into the inside of the channel, that is, into the substrate. It is shown that the degree of diffusion into these pores is proportional to the applied pressure. According to the present invention, the best result is obtained when a pressure of 1.1 bar to 1.2 bar is applied.

FIG. 3 is EDS data showing the degree to which the slurry is deposited in the pores inside the support by applying various pressures while simultaneously injecting the slurry into the channels according to the present invention. The rightmost photo result shows a coating state generated by the conventional coating method (wherein, positive pressure=0 bar), and as viewed one by one leftward, each photo shows a state where gradually higher pressures are applied, in other word, an exemplary embodiment is shown in which the pressures are applied with atmospheric pressures (from 0.1 to 0.15 to 0.2 bar). In the leftmost side photo showing a case where a 0.2 bar positive pressure was applied, it may be seen that the slurry is diffused through pores existing inside the substrate forming channels, that is, inside the support. The degree of diffusion into the pores is proportional to the applied pressure, and as the slurry is deposited in the pores, the purification efficiency of exhaust gas passing through the pores may be improved. According to the present inventors, the best catalyst effect by the present invention is provided such that the higher the slurry viscosity, the higher the pressure dispersion coating effect, and in fact, when the present invention is realized in a diesel engine for ships, the best purification effect is achieved when about 0.1 to 0.2 bar is pressurized to the slurry. In addition, according to the present invention, it is possible to realize high productivity by reducing the coating time, so as to be suitable for a large-sized support.

The invention claimed is:

1. A method for coating a monolithic porous catalyst support having a plurality of channels formed in a longitudinal direction with a catalyst slurry, the coating method comprising:
   inputting the catalyst slurry into a container having a bottom thereof moved up and down;
   moving a lower end of the catalyst support and an upper end of the container to be horizontally leveled;
   sealing the lower end of the catalyst support and the upper end of the container from outside; and
   applying a positive pressure at an upper end of the catalyst support while moving the bottom of the container upward.

2. The coating method of claim 1, further comprising:
   moving the bottom of the container downward after the applying of the positive pressure; and
   removing the slurry that is residual inside the porous catalyst support by air blowing at the upper end of the catalyst support.

3. The coating method of claim 2, further comprising:
   releasing a seal of the lower end of the catalyst support and the upper end of the container; and
   moving the container downward.

4. The coating method of claim 3, further comprising:
   drying a coated catalyst support; and
   calcinating the coated catalyst support.

* * * * *